United States Patent
Hofacker et al.

(10) Patent No.: US 6,894,182 B2
(45) Date of Patent: May 17, 2005

(54) ALIPHATIC OLIGOCARBONATE POLYOLS PREPARED IN THE PRESENCE OF A CATALYST AND A PROCESS FOR PREPARING THE SAME

(75) Inventors: Steffen Hofacker, Butzbach (DE); Christoph Gürtler, Köln (DE); Jörg Tillack, Bergisch Gladbach (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 10/298,705

(22) Filed: Nov. 18, 2002

(65) Prior Publication Data

US 2003/0125576 A1 Jul. 3, 2003

(30) Foreign Application Priority Data

Nov. 20, 2001 (DE) .......................... 101 56 896

(51) Int. Cl.[7] ............................................. C07C 333/00
(52) U.S. Cl. ...................................................... 558/240
(58) Field of Search ......................................... 558/240

(56) References Cited

U.S. PATENT DOCUMENTS

| | | | |
|---|---|---|---|
| 2,210,817 A | 8/1940 | Peterson ........................ 260/2 |
| 2,843,567 A | 7/1958 | Williams et al. ............ 260/77.5 |
| 3,313,782 A | 4/1967 | Springmann et al. ....... 260/77.5 |
| 3,631,200 A | 12/1971 | Nehring et al. ............. 260/463 |
| 4,105,641 A | 8/1978 | Buysch et al. .............. 526/712 |
| 4,533,729 A | 8/1985 | Newland et al. ............ 528/371 |
| 4,855,377 A | 8/1989 | Yokota et al. ................ 528/25 |
| 4,978,691 A | 12/1990 | Murai et al. ................ 521/172 |
| 5,070,173 A | 12/1991 | Yokota et al. ................ 528/85 |
| 5,095,098 A | 3/1992 | McLain et al. ............... 534/15 |
| 5,116,929 A | 5/1992 | Greco et al. .................. 528/44 |
| 5,143,997 A | 9/1992 | Endo et al. .................... 528/60 |
| 5,288,839 A | 2/1994 | Greco ........................ 528/204 |
| 5,430,170 A | 7/1995 | Urano et al. ................ 558/277 |
| 5,446,110 A | 8/1995 | Nakano et al. ............. 525/439 |
| 5,527,968 A | 6/1996 | Nakano et al. ............. 568/395 |
| 5,658,989 A | 8/1997 | Nakano et al. ............. 525/123 |
| 5,703,196 A | 12/1997 | Funakoshi et al. .......... 528/196 |
| 5,817,745 A | 10/1998 | Cooley et al. .............. 528/392 |
| 5,929,193 A | 7/1999 | Greco ........................ 528/196 |
| 6,156,919 A | 12/2000 | Langer et al. .............. 558/276 |

FOREIGN PATENT DOCUMENTS

| | | |
|---|---|---|
| DE | 1 955 902 | 5/1971 |
| EP | 0 478 073 | 4/1992 |
| EP | 0 893 428 | 1/1999 |
| GB | 1 263 225 | 2/1972 |
| GB | 1 476 268 | 6/1977 |
| WO | 97/03104 | 1/1997 |

OTHER PUBLICATIONS

Patent Abstracts Of Japan, vol. 2000, No. 13, Feb. 5, 2001, –JP 2000 281630 A (Mitsubishi Chemicals Corp), Oct. 10, 2000 Zusammenfassung.

Patent Abstracts Of Japan, vol. 2000, No. 16, May 8, 2001 –& JP 2001 002624 A (Mitsubishi Chemicals Corp), Jan. 9, 2001 Zusammenfassung.

Patent Abstracts Of Japan, vol. 1998, No. 01, Jan. 30, 1998 –& JP 09 241371 A (Mitsubishi Chem Corp), Sep. 16, 1997 Zusammenfassung.

*Primary Examiner*—Kamal Saeed
(74) *Attorney, Agent, or Firm*—Joseph C. Gil

(57) ABSTRACT

The present invention relates to aliphatic oligocarbonate polyols prepared by the transesterification of organic carbonates with aliphatic polyols in the presence of at least one catalyst which contains i) at least one rare earth metal or compounds thereof or ii) at least one metal of group III B of the periodic table of the elements or compounds thereof or iii) mixtures of i) and ii) and to a process for preparing the same.

4 Claims, No Drawings

ALIPHATIC OLIGOCARBONATE POLYOLS PREPARED IN THE PRESENCE OF A CATALYST AND A PROCESS FOR PREPARING THE SAME

FIELD OF THE INVENTION

The present invention relates to aliphatic oligocarbonate polyols prepared by the transesterification of organic carbonates with aliphatic polyols in the presence of at least one catalyst which contains i) at least one rare earth metal or compounds thereof or ii) at least one metal of group III B of the periodic table of the elements according to Mendeleyev or compounds thereof or iii) mixtures of i) and ii) and to a process for preparing the same.

BACKGROUND OF THE INVENTION

Oligocarbonate polyols are important preliminary products used in the preparation of plastics, paints and adhesives. They can be reacted with isocyanates, epoxides, (cyclic) esters, acids and acid anhydrides. See, for example, DE-A 1955902 and EP-A 0 343 572. They can also be prepared from aliphatic polyols by reacting with phosgene (See, for example, DE-A 1 595 446 and U.S. Pat. No. 4,533,729), bis-chlorocarbonic acid esters (See, for example, DE-A 857 948), diaryl carbonates (See, for example, DE-A 1 915 908), cyclic carbonates (See, for example, DE-A 2 523 352, DE-A 1495299 and U.S. patent application Ser. No. 787,632) and dialkyl carbonates (See, for example, DE-A 2 555 805, EP-A 0 343 572 and EP 0 533 275).

It is known that, when reacting aryl carbonates (such as diphenyl carbonate) with aliphatic polyols (such as 1,6-hexanediol), it is possible to achieve an adequate reaction conversion only by removing the alcohol compound (e.g., phenol) to shift the equilibrium of the reaction (See, for example, EP-A 0 533 275).

If, however, alkyl carbonates (e.g., dimethyl carbonate) are used, then transesterification catalysts such as alkali and alkaline earth metals, their oxides, alkoxides, carbonates, borates and salts of organic acids (See, for example, U.S. Pat. Nos. 2,210,817 and 2,843,567, DE-A 2 523 352, DE-A 1 495 299, EP-A 0 49 303, EP-A 0 754 714, EP-A 0 533 275 and WO 97/03104) are typically used.

Additionally, tin and organotin compounds such as dibutyltin, dibutyltin laurate and dibutyltin oxide (See, for example, DE-A 2 523 352, EP-A 0 364 052, EP-A 0 600 417, EP-A 0 343 572 and EP-A 0 302 712), and compounds of titanium, such as titanium tetrabutylate, titanium tetraisopropylate and titanium dioxide, are preferably used as transesterification catalysts (See, for example, U.S. Pat. No. 2,843,567, EP-A 0 849 303, EP-A 0 343 572, EP-A 0 424 219 and EP-A 0 754 714).

However, known transesterification catalysts used for the preparation of aliphatic oligocarbonate polyols by the reaction of alkyl carbonates with aliphatic polyols have some disadvantages.

When strong bases such as alkali and alkaline earth metals and their alkoxides are used as transesterification catalysts, it is necessary, once oligomerization begins, to neutralize the products in an additional step (See, for example, EP-A 0 533 275). If, on the other hand, tin compounds are used as catalysts, undesirable discoloration (such as yellowing) can occur when the resulting product is stored. This is due, inter alia, to the presence of Ti(III) compounds together with Ti(IV) compounds which are simultaneously present or is caused by the complex-forming tendency of titanium.

Additionally, organotin compounds are recognized as potential carcinogens in humans. They are therefore undesirable constituents which remain in oligocarbonate polyol secondary products if compounds such as dibutyltin oxide and dibutyltin laurate are used as catalysts.

Furthermore, it is not possible to lower the reaction temperature, which is usually between 150° C. and 230° C. (See, for example, EP-A 0 533 275 and EP-A 0 364 052), in order to avoid the formation of by-products, such as the formation of ethers and vinyl groups, which can form at an elevated temperature. Such undesirable end groups act as chain terminators for subsequent polymerization reactions, such as the reaction of polyurethane with polyfunctional (poly)isocyanates, and lead to a lowering of the crosslink density and hence to poorer product properties, such as resistance to solvents and acids (See, for example, DE-A 1 915 908). On the other hand, a more rapid transesterification reaction results in an increase in the space/time yield (lowering of the vessel occupancy time) and hence an increase in processing efficiency, which could not be previously achieved.

An object of the present invention is, therefore, to provide suitable catalysts for the transesterification reaction of organic carbonates, especially dialkyl carbonates, with aliphatic polyols for the preparation of aliphatic oligocarbonate polyols, wherein the catalysts have a higher activity and do not exhibit the disadvantages mentioned above.

Surprisingly, the object of the present invention has been achieved with the use of organic and inorganic compounds of the rare earth metals and metals of group III B of the periodic table of the elements.

SUMMARY OF THE INVENTION

The present invention relates to a process for preparing an aliphatic oligocarbonate polyol which has a number average molecular weight of from 500 to 5000 by reacting A) at least one organic carbonate and B) at least one aliphatic polyol in the presence of C) at least one catalyst which is composed of i) at least one rare earth metal, complex, organic or inorganic compound or salt thereof or mixtures thereof or ii) at least one metal of group III B of the periodic table of the elements, complex, organic or inorganic compound or salt thereof or mixtures thereof or iii) mixtures of i) and ii) provided that the rare earth metal or metal of group III B of the periodic table of the elements is not cerium, a cerium compound or lanthanum hydroxide.

The present invention also relates to an aliphatic oligocarbonate polyol which has a number average molecular weight of from 500 to 5000, which is the reaction product of A) at least one organic carbonate and B) at least one aliphatic polyol wherein A) and B) have been reacted in the presence of C) at least one catalyst which is composed of i) at least one rare earth metal, complex, organic or inorganic compound or salt thereof or mixtures thereof or ii) at least one metal of group III B of the periodic table of the elements, complex, organic or inorganic compound or salt thereof or mixtures thereof or iii) mixtures of i) and ii), provided that the rare earth metal or metal of group III B of the periodic table of the elements is not cerium, a cerium compound or lanthanum hydroxide.

DETAILED DESCRIPTION OF THE INVENTION

Catalysts of the invention can be composed of organic and/or inorganic compounds, salts and complexes of the rare earth metals and metals of group III B of the periodic table of the elements, with the exception of cerium and lanthanum hydroxide. There are used as transesterification catalysts their salts of organic acids and bases, salts of inorganic acids and bases, oxides, hydroxides, organometallic compounds, and organic and inorganic compounds.

Preferably, salts of organic acids of the rare earth metals (with the exception of cerium) and of the metals of group III B of the periodic table of the elements and organometallic compounds and complexes of the rare earth metals (with the exception of cerium) and of the metals of group III B of the periodic table of the elements are used.

Also preferred are the organic and inorganic compounds, salts and complexes of scandium, yttrium and lanthanum (with the exception of lanthanum hydroxide). Additionally, the tris(2,2,6,6-tetramethyl-3,5-heptanedionates) and the trifluoromethanesulfonates of the rare earth metals and of the metals of group III B of the periodic table of the elements are also preferred.

Examples of catalysts which can be used in the invention include scandium trifluoromethanesulfonate, yttrium trifluoromethanesulfonate, lanthanum trifluoromethanesulfonate, praseodymium trifluoromethanesulfonate, neodymium trifluoromethanesulfonate, promethium trifluoromethanesulfonate, samarium trifluoromethanesulfonate, europium trifluoromethanesulfonate, gadolinium trifluoromethanesulfonate, terbium trifluoromethanesulfonate, dysprosium trifluoromethanesulfonate, holmium trifluoromethanesulfonate, erbium trifluoromethanesulfonate, thulium trifluoromethanesulfonate, ytterbium trifluoromethanesulfonate, lutetium trifluoromethanesulfonate, scandium acetate, yttrium acetate, lanthanum acetate, praseodymium acetate, neodymium acetate, promethium acetate, samarium acetate, europium acetate, gadolinium acetate, terbium acetate, dysprosium acetate, holmium acetate, erbium acetate, thulium acetate, ytterbium acetate, lutetium acetate, scandium 2-ethylhexanoate, yttrium 2-ethylhexanoate, lanthanum 2-ethylhexanoate, praseodymium 2-ethylhexanoate, neodymium 2-ethylhexanoate, promethium 2-ethylhexanoate, samarium 2-ethylhexanoate, europium 2-ethylhexanoate, gadolinium 2-ethylhexanoate, terbium 2-ethylhexanoate, dysprosium 2-ethylhexanoate, holmium 2-ethylhexanoate, erbium 2-ethylhexanoate, thulium 2-ethylhexanoate, ytterbium 2-ethylhexanoate, lutetium 2-ethylhexanoate, scandium tris(2,2,6,6-tetramethyl-3,5-heptanedionate), yttrium tris(2,2,6,6-tetramethyl-3,5-heptanedionate), lanthanum tris(2,2,6,6-tetramethyl-3,5-heptanedionate), praseodymium tris(2,2,6,6-tetramethyl-3,5-heptanedionate), neodymium tris(2,2,6,6-tetramethyl-3,5-heptanedionate), promethium tris(2,2,6,6-tetramethyl-3,5-heptanedionate), samarium tris(2,2,6,6-tetramethyl-3,5-heptanedionate), europium tris(2,2,6,6-tetramethyl-3,5-heptanedionate), gadolinium tris(2,2,6,6-tetramethyl-3,5-heptanedionate), terbium tris(2,2,6,6-tetramethyl-3,5-heptanedionate), dysprosium tris(2,2,6,6-tetramethyl-3,5-heptanedionate), holmium tris(2,2,6,6-tetramethyl-3,5-heptanedionate), erbium tris(2,2,6,6-tetramethyl-3,5-heptanedionate), thulium tris(2,2,6,6-tetramethyl-3,5-heptanedionate), ytterbium tris(2,2,6,6-tetramethyl-3,5-heptanedionate) and lutetium tris(2,2,6,6-tetramethyl-3,5-heptanedionate).

Catalysts used in the invention can be either in solid form or in solution (for example, dissolved in one of the starting materials). It is also possible to use mixtures of two or more catalysts.

The concentration of catalyst present is from 0.01 ppm to 10,000 ppm, preferably, from 0.1 ppm to 5000 ppm, more preferably, from 1 ppm to 1000 ppm, based on the total mass of the organic carbonate and aliphatic polyol.

The reaction temperature of the transesterification reaction of at least one organic carbonate with at least one aliphatic polyol in the presence of at least one catalyst according to the invention for the preparation of aliphatic oligocarbonate polyols having a number average molecular weight of from 500 to 5000 is from 40° C. to 250° C., preferably, from 60° C. to 230° C., more preferably, from 80° C. to 210° C.

Examples of organic carbonates which can be used include aryl, alkyl and alkylene carbonates. Such compounds are simple to prepare and are readily available (See, for example, EP-B 0 534 545, EP-A 0599 287 and EP-B 0 445 891). Examples of these compounds include diphenyl carbonate (DPC), dimethyl carbonate (DMC), diethyl carbonate (DEC) and ethylene carbonate. Diphenyl carbonate, dimethyl carbonate and diethyl carbonate are preferably used. More preferably, diphenyl carbonate and dimethyl carbonate are used.

Aliphatic polyols which can be used in the invention include aliphatic alcohols having from 2 to 25 carbon atoms (linear, cyclic, branched, unbranched, saturated and unsaturated) having an OH functionality $\geq 2$ (primary, secondary and tertiary).

Examples of aliphatic polyols which can be used in the invention include ethylene glycol, 1,3-propylene glycol, 1,3-butanediol, 1,4-butanediol, 1,6-hexanediol, 2-ethylhexanediol, trimethylolpropane and pentaerythritol.

It is also possible to use polyols obtained from a ring-opening reaction of a lactone with an aliphatic alcohol (linear, cyclic, branched, unbranched, saturated and unsaturated) having an OH functionality $\geq 2$ (primary, secondary and tertiary), such as the adduct of ε-caprolactone and 1,6-hexanediol, ε-caprolactone and trimethylolpropane or mixtures thereof.

Additionally, mixtures of the above-mentioned polyols can also be used as the aliphatic polyol.

Preferably, aliphatic and cycloaliphatic, branched and unbranched, primary and secondary polyols having an OH functionality $\geq 2$ are used. More preferably, aliphatic, branched and unbranched, primary polyols having a functionality $\geq 2$ are used.

The transesterification reaction of at least one organic carbonate and at least one aliphatic polyol in the presence of at least one catalyst according to the invention can be carried out either under atmospheric pressure or under reduced or elevated pressure of from $10^{-3}$ to $10^3$ bar.

The following examples merely illustrate the invention. Those skilled in the art will recognize many variations that are within the spirit of the invention and scope of the claims.

EXAMPLE 1

Determination of the Catalytic Activity of the Catalysts Used According to the Invention in Comparison with the Activity of Known Catalysts for the Reaction of DMC and 1-hexanol:

In order to allow the pre-selection of suitable transesterification catalysts for the preparation of aliphatic oligocarbonates from organic carbonates (in this case, dimethyl carbonate) and aliphatic polyols (e.g., 1,6-hexanediol), dimethyl carbonate (3.06 g) and 1-hexanol (6.94 g) in a molar ratio of 1:2 were mixed in a 20 ml rolled-edge glass vessel together with a constant amount ($5.7 \cdot 10^{-6}$ mol) of a catalyst (as set forth in Table 1) and sealed with a septum of natural rubber including a gas outlet. If the catalyst used was in the solid state of aggregation at room temperature, it was first dissolved in one of the starting materials. The reaction mixture was heated at 80° C. for six hours and stirred. After cooling to room temperature, analysis of the product spectrum was carried out with gas chromatography, optionally, coupled with investigations by mass spectrometry.

The content of the reaction products, namely, of methylhexyl carbonate or dihexyl carbonate, which can be regarded as a measure of the activity of the transesterification catalyst used, was quantified by integral evaluation of the respective gas chromatograms. The results of the investigations of the activity of the catalysts used according to the invention, in direct comparison with conventional transesterification catalysts (such as dibutyltin oxide, dibutyltin laurate, titanium tetraisopropylate and magnesium carbonate) are listed in Table 1.

The choice of catalysts used according to the invention in Table 1 is by way of example.

TABLE 1

Catalysts used and reaction product contents:

| Catalyst number | Catalyst | Methylhexyl carbonate content [% by surface area] | Dihexyl carbonate content [% by surface area] | Sum of contents [% by surface area] |
|---|---|---|---|---|
| 1* | without catalyst | 4.0 | 0.1 | 4.1 |
| 2* | Dibutyltin oxide | 5.1 | 0.2 | 5.3 |
| 3* | Dibutyltin laurate | 3.4 | 0.1 | 3.5 |
| 4* | Titanium tetraisopropylate | 1.9 | 0.0 | 1.9 |
| 5* | Magnesium carbonate | 2.1 | 0.1 | 2.2 |
| 6 | Scandium triflate | 0.7 | 0.0 | 0.7 |
| 7 | Yttrium triflate | 13.5 | 1.5 | 15.0 |
| 8 | Yttrium 2-ethylhexanoate | 6.5 | 0.3 | 6.8 |
| 9 | Lanthanum triflate | 8.8 | 0.7 | 9.5 |
| 10 | Lanthanum 2-ethylhexanoate | 4.5 | 0.1 | 4.6 |
| 11 | Cerium(IV) triflate | 5.4 | 0.2 | 5.6 |
| 12 | Praseodymium triflate | 10.9 | 1.0 | 11.9 |
| 13 | Praseodymium (dpm)$_3$ | 11.2 | 0.8 | 12.0 |
| 14 | Neodymium triflate | 11.2 | 1.1 | 12.3 |
| 15 | Neodymium (dpm)$_3$ | 10.4 | 0.6 | 11.1 |
| 16 | Samarium triflate | 12.9 | 1.5 | 14.4 |
| 17 | Samarium (dpm)$_3$ | 20.4 | 3.5 | 23.9 |
| 18 | Europium triflate | 11.4 | 1.1 | 12.5 |
| 19 | Europium (dpm)$_3$ | 17.7 | 2.2 | 19.9 |
| 20 | Gadolinium triflate | 12.5 | 1.3 | 13.8 |
| 21 | Gadolinium (dpm)$_3$ | 20.6 | 3.4 | 24.0 |
| 22 | Terbium triflate | 14.1 | 1.8 | 15.9 |
| 23 | Terbium (dpm)$_3$ | 24.5 | 6.0 | 30.5 |
| 24 | Dysprosium triflate | 16.3 | 2.6 | 18.9 |
| 25 | Dysprosium (dpm)$_3$ | 26.0 | 8.0 | 34.0 |
| 26 | Holmium triflate | 17.0 | 2.9 | 19.9 |
| 27 | Holmium (dpm)$_3$ | 25.4 | 7.3 | 32.7 |
| 28 | Erbium triflate | 14.8 | 2.0 | 16.8 |
| 29 | Erbium (dpm)$_3$ | 27.0 | 11.0 | 38.0 |
| 30 | Thulium triflate | 15.9 | 2.4 | 18.3 |
| 31 | Thulium (dpm)$_3$ | 25.8 | 7.7 | 33.5 |
| 32 | Ytterbium triflate | 20.1 | 4.5 | 24.6 |
| 33 | Ytterbium (dpm)$_3$ | 26.8 | 11.3 | 38.1 |
| 34 | Lutetium triflate | 13.6 | 1.5 | 15.1 |

*Comparison
"triflate" means trifluoromethanesulfonate; and
"(dpm)$_3$" means tris(2,2,6,6-tetramethyl-3,5-heptanedionate).

As illustrated in column five of Table 1, the activity of the catalysts used according to the invention is markedly superior to that of known catalysts. This is especially the case with the use of organometallic pounds, complexes and/or salts of organic acids of the rare earth metals, of yttrium and of lanthanum, such as the trifluoromethanesulfonates, the tris(2,2,6,6-tetramethyl-3,5-heptandionates) and the 2-ethylhexanoates.

EXAMPLE 2

Determination of the Catalytic Activity of the Catalysts Used According to the Invention in Comparison with the Activity of Known Catalysts for the Reaction of DMC and 1,6-Hexanediol for the Preparation of the Corresponding Aliphatic Oligocarbonate Diol:

In order to determine the catalytic activity for the preparation of aliphatic oligocarbonates from organic carbonates (dimethyl carbonate) and aliphatic polyols (1,6-hexanediol), dimethyl carbonate (4.15 g) and 1,6-hexanediol (5.85 g) were mixed in a 20 ml rolled-edge glass vessel together with a constant amount (5.7·10$^{-6}$ mol) of a catalyst (as set forth Table 2) and sealed with a septum of natural rubber including a gas outlet. The molar ratio of dimethyl carbonate and 1,6-hexanediol was chosen so that, upon complete conversion, an aliphatic oligocarbonate diol having a number average molecular weight of 2000 was obtained. If the catalyst used was in the solid state of aggregation at room temperature, it was first dissolved in one of the starting materials. The reaction mixture was heated at 80° C. for six hours and stirred. After cooling to room temperature, analysis of the product spectrum was carried out with gas chromatography, optionally, coupled with investigations by mass spectrometry.

The content of desired reaction products (e.g., monoesters, diesters and oligocarbonates), which can be regarded as a measure of the activity of the transesterification catalyst used, was first identified with the aid of methods of gas chromatography and mass spectrometry and was then quantified by integral evaluation of the respective gas chromatograms.

The results of the investigations of the activity of catalysts used according to the invention, in direct comparison with conventional transesterification catalysts (such as dibutyltin oxide, dibutyltin laurate, titanium tetraisopropylate and magnesium carbonate) are listed in Table 2.

The choice of catalysts used according to the invention in Table 2 is by way of example.

TABLE 2

Catalysts used and reaction product contents:

| Catalyst number | Catalyst | Content of reaction products [% by surface area] |
|---|---|---|
| 1* | without catalyst | 4.8 |
| 3* | Dibutyltin laurate | 3.3 |
| 4* | Titanium tetraisopropylate | 1.6 |
| 5* | Magnesium carbonate | 4.5 |
| 6 | Scandium triflate | 1.3 |
| 7 | Yttrium triflate | 15.3 |
| 8 | Yttrium 2-ethylhexanoate | 5.4 |
| 9 | Lanthanum triflate | 12.2 |
| 10 | Lanthanum 2-ethylhexanoate | 11.1 |
| 25 | Dysprosium (dpm)$_3$ | 18.6 |
| 27 | Holmium (dpm)$_3$ | 20.2 |
| 29 | Erbium (dpm)$_3$ | 41.1 |
| 32 | Ytterbium triflate | 46.3 |
| 33 | Ytterbium (dpm)$_3$ | 29.5 |

*Comparison
"triflate" means trifluoromethanesulfonate; and
"(dpm)$_3$" means tris(2,2,6,6-tetramethyl-3,5-heptanedionate).

The results clearly demonstrate that the activity of the catalysts used according to the invention is markedly superior to that of known catalysts. This is especially the case with the use of organometallic compounds, complexes and/or salts of organic acids of the rare earth metals, of yttrium and of lanthanum, such as the trifluoromethanesulfonates, the tris(2,2,6,6-tetramethyl-3,5-heptandionates) and the 2-ethylhexanoates.

It is thus possible, employing the catalysts used according to the invention, to avoid the above-described disadvantages in the preparation of aliphatic oligocarbonate polyols by the transesterification of organic carbonates, especially alkyl carbonates, and aliphatic polyols having an OH functionality $\geq 2$, such as high reaction temperatures, which lead to undesirable secondary reactions and long vessel occupancy times.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aliphatic oligocarbonate polyol which has a molecular weight of from 500 to 5000 which comprises the reaction product of:
   A) at least one organic carbonate selected from diphenyl carbonate, dimothyl carbonate, diethyl carbonate and ethylene carbonate; and
   B) at least one aliphatic polyol selected from linear, cyclic, branched, unbranched, saturated or unsaturated polyols having from 2 to 25 carbon atoms and primary, secondary or tertiary hydroxyl functionality of greater than or equal to 2;
   wherein A) and B) have been reacted in the presence of
   C) at least one catalyst comprising
      i) at least one rare earth metal, complex, organic or inorganic compound or salt thereof or mixtures thereof; or
      ii) at least one metal of group III B of the periodic table of the elements, complex, organic or inorganic compound or salt thereof or mixtures thereof; or
      iii) mixtures of i) and ii);
      provided that the rare earth metal or metal of group III B of the periodic table of the elements is not cerium, a cerium compound or lanthanum hydroxide.

2. The aliphatic oligocarbonate polyol of claim 1 wherein the organic carbonate is dimethyl carbonate, diethyl carbonate or diphenyl carbonate.

3. The aliphatic oligocarbonate polyol of claim 1 wherein the aliphatic polyol is a diol, an aliphatic diol, a triol, a ring-opening adduct of an aliphatic diol and a lactone or a ring-opening adduct of an aliphatic diol and ϵ-caprolactone or mixtures thereof.

4. The aliphatic oligocarbonate polyol of claim 1 wherein the aliphatic polyol is 1,6-hexanediol, a ring-opening adduct of 1,6-hexanediol and ϵ-caprolactone or mixtures thereof.

* * * * *